United States Patent [19]

Gordon et al.

[11] Patent Number: 5,159,480
[45] Date of Patent: Oct. 27, 1992

[54] INFRARED WIDEBEAM COMMUNICATION TRANSMITTER

[75] Inventors: David L. Gordon; Larry W. Dunford; Rodger T. Moloney; Nevin P. Carr, all of Chesapeake, Va.

[73] Assignee: Cactus Services, Inc., Chesapeake, Va.

[21] Appl. No.: 529,325

[22] Filed: May 29, 1990

[51] Int. Cl.$^5$ ............... H04B 10/00; H04B 10/04
[52] U.S. Cl. .................. 359/181; 359/154; 250/495.1
[58] Field of Search ............... 455/601, 603, 604, 608, 455/609, 611, 613, 617, 618; 250/495.1, 494.1; 362/35; 340/825.54; 359/144, 154, 181, 142

[56] References Cited

U.S. PATENT DOCUMENTS

| | | | |
|---|---|---|---|
| 3,808,429 | 4/1974 | Miller, Jr. et al. | 250/199 |
| 4,290,043 | 9/1981 | Kaplan | 455/604 |
| 4,464,759 | 8/1984 | Haus et al. | 372/92 |
| 4,680,811 | 7/1987 | Harper et al. | 455/617 |
| 4,707,595 | 11/1987 | Meyers | 250/504 R |
| 4,717,913 | 1/1988 | Elger | 340/825.54 |
| 4,727,600 | 2/1988 | Avakian | 455/601 |

FOREIGN PATENT DOCUMENTS 0181245 7/1989 Japan .................. 455/613

Primary Examiner—Edward L. Coles, Sr.
Assistant Examiner—Kinfe-Michael Negash
Attorney, Agent, or Firm—Sandler, Greenblum & Bernstein

[57] ABSTRACT

An infrared transmission capable of acting as a beacon, signalling or data transmission device between two mobile vehicles is provided. The transmission system employs semiconductor solid state devices to produce infrared energy. The infrared energy is directed and formed into a beam of energy that is omni-directional horizontally and narrow vertically. The produced beam of infrared energy is then modulated by an information signal to convey information to a remote receiving device. Further, the solid state devices can be operated in a continuous fashion to produce continuous infrared radiation energy for use as a beacon. The solid state devices can be operated intermittently to produce pulsed infrared radiation and energy for operation as a signalling device or as a digital data or analog transmission device. As semiconductor solid state devices, infrared emitting diodes or IR laser diodes can be utilized. The infrared transmission system is particularly suited for shipboard use.

22 Claims, 4 Drawing Sheets

INFRARED WIDEBEAM COMMUNICATION TRANSMITTER

BACKGROUND OF THE INVENTION

1. Technical Field of the Invention

The present invention relates to the field of infrared signalling or data transmission devices. In particular, the present invention is directed to an infrared signalling device of the type currently used on board naval vessels. The present invention is intended to reduce the weight, size and power requirements of existing infrared signalling and data transmission devices.

2. Description of the Background of the Invention

Conventional infrared signalling or beacon devices for use on board naval vessels generally utilize a powerful incandescent light source. A heavy red filter is positioned thereabout, which allows only the infrared frequencies of the light to be emitted by the filter. Such devices suffer from many drawbacks and disabilities, especially when used on board ships and especially when mounted at mast height on such ships. Incandescent infrared signalling devices are generally quite heavy. Their large weight results from their requirement of a visible light filter to filter out the visible light and allow only the infrared light to be transmitted. The weight of such incandescent devices is further increased by the need for an external cylindrical fresnel lens for focusing the infrared light emitted by the visible light filter. Further, the conventional infrared signalling devices must support the visible light filter and external fresnel lens, and thus require very heavy lamp supporting structures.

Further, the conventional infrared signalling and beacon devices lack any data transmission capabilities. Since the existing devices utilize incandescent lamps which generally employ tungsten filaments and which are heated to their glowing state, as their light source, these devices cannot be turned on and off at the high rates that would be required for data transmission. Thus the conventional infrared transmitters cannot perform digital data or voice transmission and communication at data rates greater than nine (9) words per minute.

A conventional prior art infrared signalling device currently used on board naval vessels is represented by the U.S. Navy's SAT 2N IR device. This infrared signalling and beacon device utilizes an incandescent bulb, a visible light filter and an external cylindrical fresnel lens to produce the beam of infrared light. The structure of this conventional device is quite massive, and use of a large incandescent bulb generates a substantial amount of heat energy which can damage the device.

The present invention discloses an infrared communication transmission system which utilizes semiconductor solid state devices instead of the incandescent bulbs and visible light filters of the prior art. Thus, a very substantial weight reduction compared to the conventional incandescent infrared transmitter is achieved by the elimination of the incandescent bulb, visible light filter, fresnel lens and the very heavy lamp supporting structure required by these components. The use of a solid state semiconductor device results in very efficient energy conversion, less generated heat to be dissipated, and a small size, of all which enable a much more compact and efficient design. In turn, the use of the more compact design results in enabling the further reduction of the size of the infrared transmitter and an even further reduction in the heat generated by the transmitter.

Further, the solid state communication transmitter of the invention has a data transmitting capability not available in existing infrared beacon and signalling devices. The use of solid state devices makes the present infrared communication transmitter very suitable for the modulation of the infrared energy that is required to achieve the high data rates necessary for digital data or analog voice communications.

SUMMARY OF THE INVENTION

The infrared communications transmission system according to a feature of the invention comprises an assembly of a plurality of solid state semiconductor devices arranged in an array and comprising means for generating a radiation pattern that is omni-directional horizontally and narrow vertically. Means for generating an information bearing signal is also provided. Further, the device provides for modulating the infrared energy of the radiation pattern by the information bearing signal to produce the modulated infrared energy of the radiation pattern. Finally, the transmitter includes a mechanism for transmitting the modulated infrared energy of the radiation pattern towards a remote infrared receiver.

The infrared communications transmission system according to the invention includes an assembly of solid state semi-conductor devices arranged on a mounting form in the shape of a cylinder. The infrared communications transmitter according to the invention includes a printed circuit pattern for the assembly of solid state semiconductor devices mounted on the inside of the mounting form.

The infrared communications transmission system according to a feature of the invention includes a mounting form that is cylindrical. The infrared communications transmitter according to the invention utilizes a solid state semiconductor device that is an infrared emitting diode.

The infrared communications transmission system according to a further feature of the invention utilizes a solid state semiconductor device that is an IR laser diode. The infrared communication transmitter of the invention includes solid state devices in an array that is cylindrical.

The infrared communications transmission system of the present invention generates a radiation pattern that is continuously emitted, and the continuously emitted radiation pattern comprises a beacon. Furthermore, the infrared communications transmitter of the present invention also generates a radiation pattern that contains pulsed infrared energy of the pattern, and the pulsed infrared energy pattern comprises a signal. A further feature of the infrared communication transmitter according to the invention includes infrared energy of the radiation pattern that is pulsed infrared energy, and the pulsed infrared energy of the radiation pattern comprises a digital data transmission. A yet even further feature of the infrared communication transmitter pattern that contains varied infrared energy of the radiation, pattern, and the varied infrared energy of the pattern comprises an analog data transmission. The infrared communications transmitter according to the invention includes an apparatus for generating a radiation pattern and for supplying electrical power to an array of solid state semiconductor devices. The array of solid state semiconductor devices are linearly and radially mounted.

BRIEF DESCRIPTION OF THE DRAWINGS

The invention is further explained in the detailed description which follows, with reference to the drawings, by way of non- limiting examples of the various embodiments of the invention, in which like reference numerals represent similar parts throughout the several views, and wherein.

DESCRIPTION OF THE PREFERRED EMBODIMENT OF THE INVENTION

Figure 1:
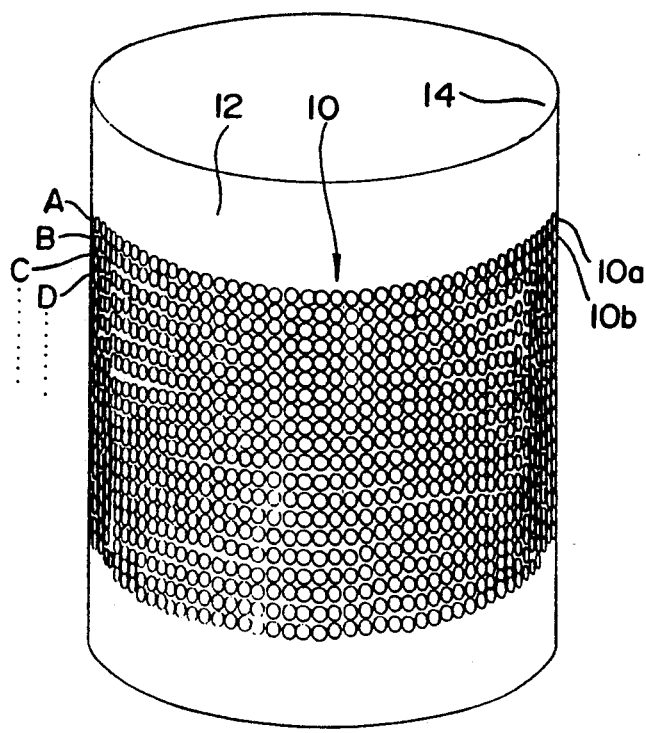
FIG. 1 is a schematic perspective view of a representative assembly of infrared emitting devices.

With detailed reference to the drawings and in particular with reference to FIG. 1, there is illustrated in schematic form the basic structure of the infrared communications transmitter of the present invention. The individual solid state semiconductor devices 10a, 10b . . . 10n and etc. are mounted to the exterior surface of generally cylindrical form 12 to direct and configure the shape of the radiation emitted thereby to form a omni-directional horizontal, and narrow vertical, radiation pattern. The individual solid state devices are attached to a mounting form in individual rows A, B, C . . . around the external periphery of the form and are electrically connected internally of the form. A plurality of aligned rows of solid state semiconductors devices are provided according to the invention and the semiconductor devices are mounted linearly and radially about the form. The mounting form 12 illustrated in FIG. 1 is shown to be of generally cylindrical shape. Advantages similar to the present invention can be achieved by the use of mounting forms of circular cylindrical shape, polyhedral cylindrical shape or hemispherical shape, for example. The use of other shapes is also possible, and such other shapes are encompassed within the scope of the present invention. The present invention involves the use of an array of solid state devices, i.e., more than one row of such devices positioned around the periphery of the mounting form. When mounted in such an array these individual solid state devices 10a, 10b, etc are aligned in a linear and radial pattern on the surface of the mounting form. The arrangement of the solid state devices determine the nature of the composite radiation pattern.

The use of an array of such devices, as opposed to a single row of such solid state devices, results in a substantial increase in the power of the infrared transmitter. A (non-illustrated) printed circuit pattern is provided, in a conventional manner, on the interior surface 14 of the mounting form and is connected to each of the individual solid state devices to thereby electrically connect, configure, and apply power to the array of solid state devices that are mounted on the outside of the form. Electrical connections (non-illustrated) are provided for connecting the circuit pattern on the inside surface of the form to the individual one of the array of solid state devices positioned about the outer surface of the mounting form.

When electrical power is provided to each of the individual solid state devices from the non-illustrated printed circuit pattern which provides power thereto, each of the individual devices emits an infrared radiation pattern. The composite radiation pattern of the entire array of infrared solid state semiconductor devices is shown most clearly in FIG. 2.

Figure 2:
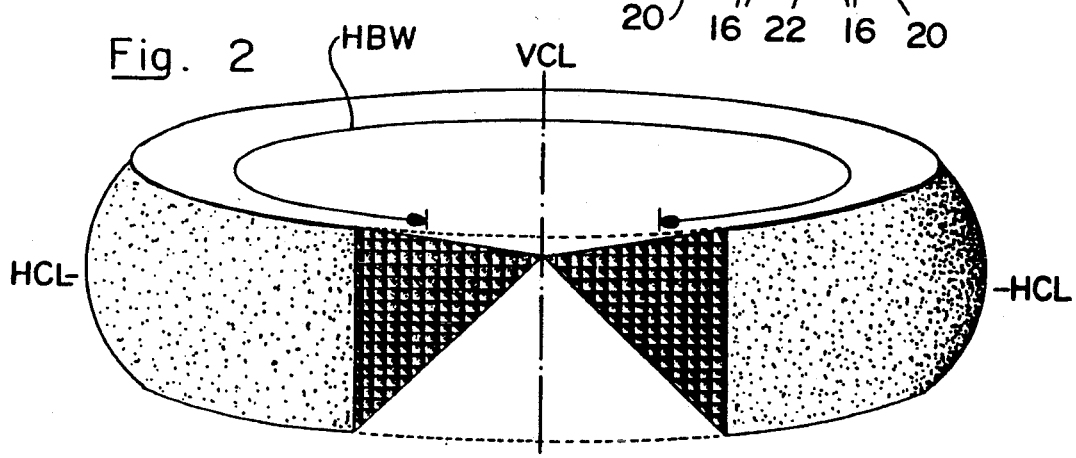
FIG. 2 shows the composite radiation pattern emitted by the array of FIG. 1.

Referring to FIG. 2, which shows a representative infrared radiation pattern emitted by the present transmitter, the composite radiation pattern generated by the array 10 of solid state devices has a vertical centerline VCL—VCL as well as a horizontal centerline HCL—HCL about which the pattern is symmetrical. The radiation pattern is also defined by a vertical beamwidth VBW and a horizontal beamwidth HBW, both of which are products of the shape of and geometry of the solid state device array, and the individual solid state device radiation patterns.

The electrical power supply 70 (see FIG. 7) to the above described semiconductor array is, per se, conventional and typically would consist of a constant current regulator and current pulsing circuitry connected to the array of solid state devices that convert the electrical power into infrared energy that is modulated and driven by the input information signal.

The shape of the array in which the solid state infrared emitting devices are mounted will have a profound effect upon the shape of the resultant composite radiation pattern. Thus mounting of the solid state devices in a cylindrical array will yield a radiation pattern of maximum intensity along the horizontal center line HCL of the array. The composite pattern will be omni-directional horizontally. This results directly from the use of a cylindrically shaped mounting form having the solid state devices secured about the periphery thereof. The pattern will also be wedge shaped vertically because of the individual solid state device vertical radiation pattern, and taking into account the spreading of the pattern as it radiates outwardly from the transmitter source. The horizontal beam of each individual solid state device overlaps with the beams of the adjacent devices to provide a complete omni-directional radiation pattern. The solid state device beam width in the vertical direction determines the composite vertical beam width of the radiation pattern.

Figure 3:
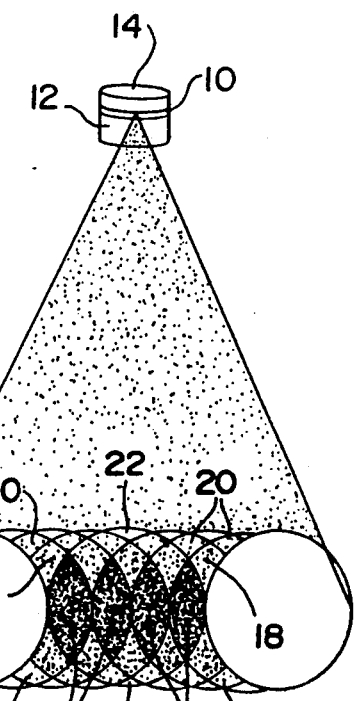
FIG. 3 shows, in schematic form, one representative example of the details of the additive intensities of one row of the individual solid state devices of the invention.

The additive nature of the radiation pattern generated by the array solid state devices results from the overlapping nature of the closely spaced solid state devices. This feature is most clearly illustrated in FIG. 3, which illustrates a cone shaped radiation pattern generated by four (4) solid state devices spaced closely adjacent to each other in a single horizontally disposed, circularly shaped row of said devices which make up a small portion of the solid state device array of the infrared transmitter of the present invention. The cone shaped radiation pattern generated by these four (4) solid state devices produces regions having four (4) different intensity levels of infrared radiation. The intensity of radiation in each particular region is an integral factor in the radiation intensity produced by a single solid state device. Thus, with reference to FIG. 3, each region 16 has an intensity four times that of a single device, the regions 18 have an intensity three times that of a single device, while the regions 20 and 22 have intensities equal to twice a single device and equal to a single device, respectively. The arrangement, phasing, and number of solid state devices provided in the infrared transmitter determines the particular shape and intensity of the radiation produced by the composite device.

Figure 4:
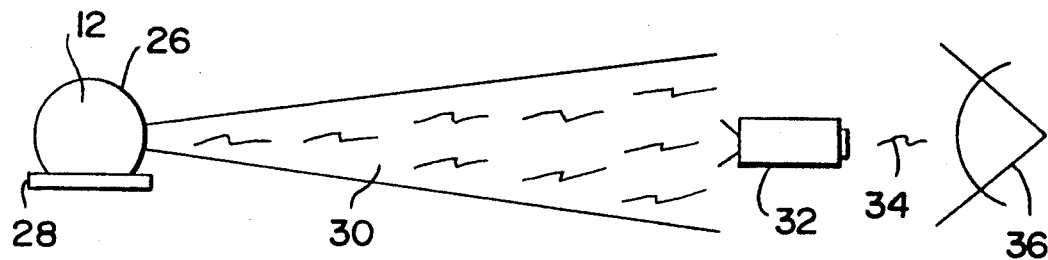
FIG. 4 illustrates the inventive infrared transmitter utilized in the beacon and signalling operation modes.
Figure 5:
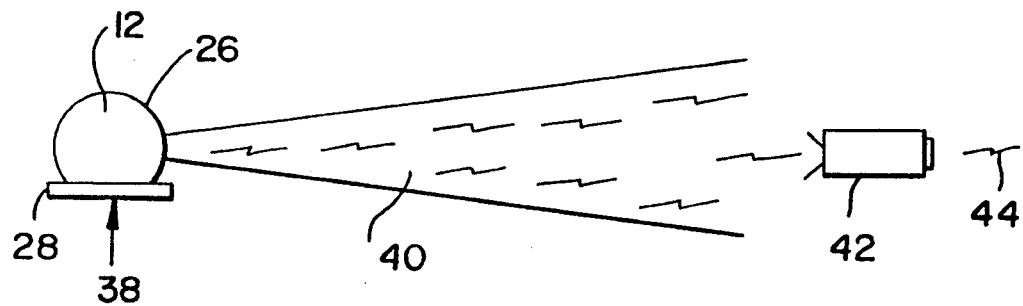
FIG. 5 shows the inventive infrared transmitter utilized in the analog and digital data communication operational modes.

FIGS. 4 and 5 show the infrared transmitter being used in beacon and signal operation modes, utilizing a beacon data input 45 and a signal data input 46 (see FIG. 7), respectively, as well as in the digital data operational mode. In both of these operational modes, electrical power is supplied to the infrared transmitter. Thus, an external power source of any conventional type, e.g., a powerline connection or a generator hookup, is provided to supply electrical power of proper voltage to the array of solid state devices via the (nonillustrated) printed circuitboard provided on the inside 14 of the mounting form 12 of the solid state devices. The solid state devices, by virtue of their inherent nature, convert electrical power into infrared energy. The internal structure of the individual solid state devices and/or optics that may be provided can focus and shape the generated infrared energy into a focused radiation pattern. The physical arrangement of the solid state devices, i.e., their spacing, their number, and the power input to them, all determine the composite radiation pattern generated by the infrared transmitter.

Figure 7:
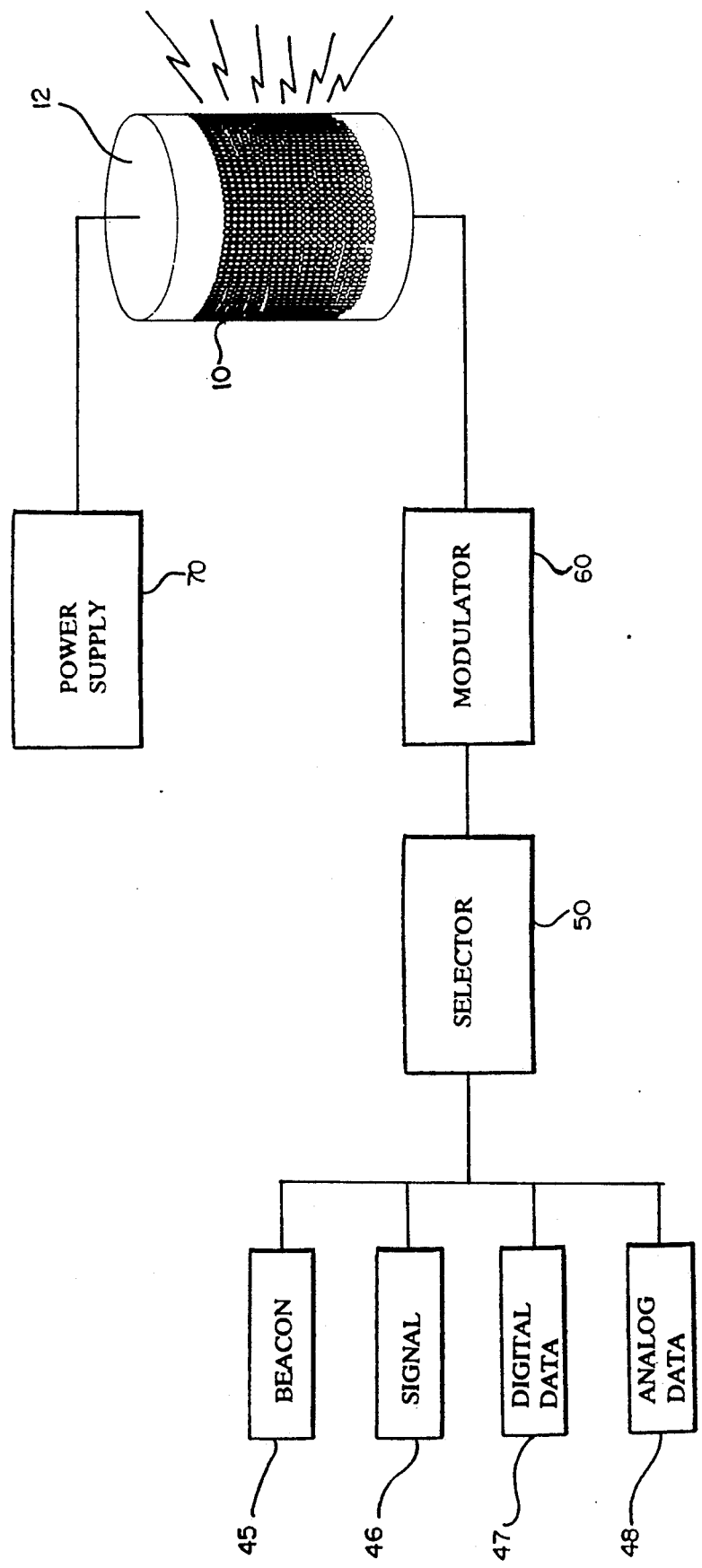
FIG. 7 illustrates, in block diagram form, a non-limiting schematic example of an arrangement of the inventive infrared communication transmission system.

Modulation of the infrared energy produced by the array of solid state devices can be effected through conventional modulation of the electrical power input to the array of devices by a modulator 60 (see FIG. 7). Typical modulation methodologies, for both digital and analog data transmission, that can be utilized include frequency-shift-keying (FSK), Pulse Coded Modulation (PCM), and Amplitude Modulation (AM). Thus the information signal, be it in the signal mode of operation or in the digital or analog data modes of operation, acts to modulate the solid state device input power, which in turn modulates the generated infrared energy and the radiation pattern produced by the infrared transmitter. Digital data inputs 47 control pulses of electrical current to the solid state devices. Analog data inputs 48 linearly vary the electrical current to the solid state devices.

FIG. 4 displays the beacon and signalling operational modes of the infrared transmitter and remote receiving device. During the beacon or signal mode of operation, the infrared transmitter 12, housed within a casing 26 and mounted to a support member 28, is operated to generate a continuous radiation pattern 30. This pattern serves as a beacon defining the locational position of the transmitter and the naval vessel or other vehicle to which it is mounted. During a signal operational mode use of the infrared transmitter, the operator rapidly turns the transmitter on and off according to Morse code or any other conventional signalling system. Thus, pulsed infrared energy 30 is radiated by the transmitter device. The pulsed energy travels through space and is received by a receiving device 32. As shown in FIG. 4, an infrared night vision device 32 is utilized as the receiving device, e.g., for receiving the infrared radiation pattern at a remote location. Such a night vision device is conventional and transforms the infrared radiation pattern to pulsed or continuous visible light signals 34, which can then be viewed by the distant operator 36 of the night vision device.

The operation of the infrared communications transmitter of the present invention proceeds according to the digital data transmission operational mode as shown in FIG. 5. For operation in the digital data transmission mode, the infrared transmitter of the invention is modulated by a digital data signal 38, derived from e.g., a system computer data output port, voice digital data, video digital or TTY data inputs. Thus, pulsed infrared energy 40 is radiated by the infrared transmitter and travels through space until it is received by an infrared digital data receiver 42 to convert the pulsed infrared energy into a digital data signal 44. The digital data signal 44 can then be transmitted to any conventional printer, recorder or imaging device to convert the electrical data signal to usable readable, or visible form.

In the analog (voice) transmission mode, wherein the signal can be derived from voice analog voltages or analog signals, the input analog signal to the infrared transmitter is modulated by an analog system. Infrared intensity variations are received by an infrared receiver which demodulates the infrared intensity variations to produce a voice or other form of analog signal, which can then be transmitted, stored, or utilized in any conventional manner.

Modulation of the output infrared energy of the infrared transmitter, in the digital and analog transmission mode, is effected through modulation of the signal input. Various means for achieving such modulation can be utilized. The modulation means utilized are not included within the scope of the present invention as any conventional method and apparatus for modulating an electrical signal (such as FSK, PCM, or AM) to produce an information bearing signal can be utilized together with the transmitter of this invention in order to modulate the power input thereto.

Figure 6:
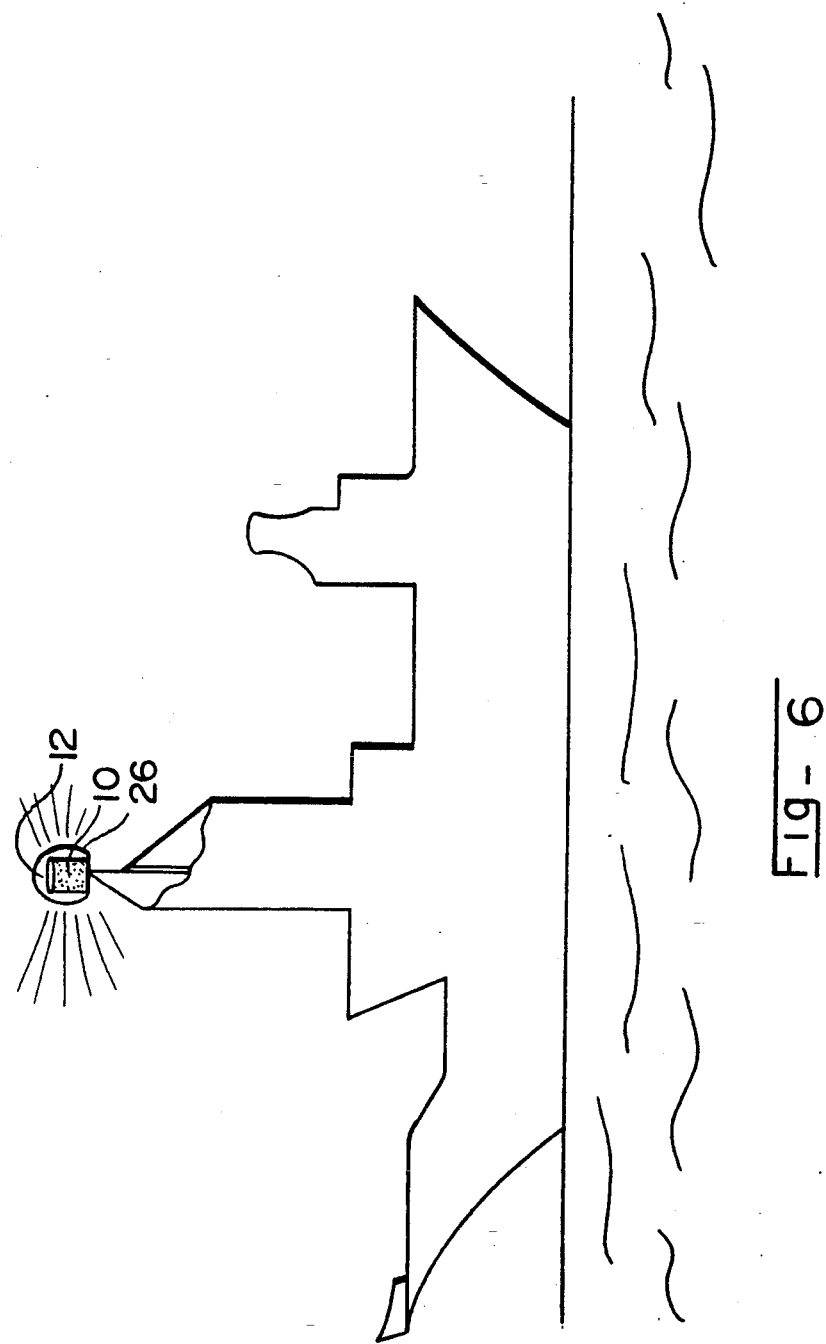
FIG. 6 shows in schematic form, the inventive infrared transmitter mounted at masthead in a naval vessel.

FIG. 6 shows, in schematic form, the infrared communications transmitter of the present invention mount in a preferred use environment; at masthead in a naval vessel. When so utilized, the present invention yields substantial benefits over conventional infrared signalling devices such as decreased size, weight and power requirements as well as a data transmission capability. Nevertheless, this figure depicts only an example of a suitable use environment and use of the invention in any environment where its particular benefits are desired, is explicitly contemplated as being within the preview of the invention.

FIG. 7 illustrates, in block diagram form, a schematic example of the relationship between the major system components of the infrared communication transmission system of the present invention. As discussed above, the present invention includes an infrared transmitter 12, with an array of solid state devices 10 that are connected to a power supply 70. A modulator 60, utilizing conventional modulation techniques, such as FSK, PCM, AM, etc., is connected to the infrared transmitter 12 to modulate the outputted infrared energy of the transmitter 12. The modulator 60 modulates the infrared energy based on a signal input 45-48 selectively provided from a selector apparatus 50, to transmit the modulated infrared energy as a beacon pattern, a single pattern, a digital data pattern or an analog data pattern. The selector 50, by way of a non-limiting example, may consist of a conventional multiplexer.

While the invention has been described in its preferred embodiments, it is to be understood that the words which have been used are words of description rather than words of limitation. Changes may be made within the purview of the appended claims without departing from the true scope and spirit of the invention in its broader aspects. Although the invention has been described herein with reference to particular means, materials and embodiments, it is understood that the invention is not to be limited to the particulars disclosed herein, and that the invention extends to all equivalents within the scope of the appended claims, which are the measure of the scope of the invention herein disclosed.

What is claimed is:

1. An infrared communication transmission system comprising:
    an assembly comprising a plurality of solid state semiconductor devices arranged in an array, said array defining a shape and comprising means for generating an infrared radiation pattern that is omni-directional horizontally and narrow vertically;
    means for generating an information bearing signal;
    means for modulating said radiation pattern by said information bearing signal to produce a modulated infrared energy of the radiation pattern; and
    means for transmitting said modulated radiation pattern towards a remote infrared receiver.

2. An infrared communication transmission system according to claim 1, wherein said array comprises said plurality of solid state semiconductor devices arranged in the shape of a cylinder.

3. An infrared communication transmission system according to claim 1, wherein said assembly is positioned about a mounting form, and further comprising a printed circuit pattern for said assembly of solid state semiconductor devices, said printed circuit pattern mounted on the inside of said mounting form.

4. An infrared communication transmission system according to claim 3, wherein said mounting form is cylindrical.

5. An infrared communication transmission system according according to claim 1, wherein each one of said solid state semiconductor devices is an infrared light emitting diode.

6. An infrared communication transmission system according to claim 1, wherein each of said solid state semiconductor devices is an IR laser diode.

7. An infrared communication transmission system according to claim 1, wherein said array is cylindrical.

8. An infrared communication transmission system according to claim 1, wherein said radiation pattern comprises continuously emitted infrared energy of said radiation pattern and said continuously emitted infrared energy comprises a beacon.

9. An infrared communication transmission system according to claim 1, wherein said radiation pattern comprises pulsed infrared energy and said pulsed infrared energy comprises a signal.

10. An infrared communication transmission system according to claim 1, wherein said radiation pattern comprises pulsed infrared energy and said pulsed infrared energy comprises a digital data transmission.

11. An infrared communication transmission system according to claim 1, wherein said radiation comprises varied infrared energy and said varied infrared energy comprises an analog data transmission.

12. An infrared communication transmission system according to claim 1, wherein said means for generating a radiation pattern includes means for supplying electrical power to said array of solid state semiconductor devices.

13. An infrared communication transmission system according to claim 4, wherein said solid state semiconductor devices are mounted linearly and radially about said cylindrical mounting form.

14. An infrared communication transmission system according to claim 7 wherein said solid state semiconductor devices of said array are linearly and radially mounted.

15. An infrared communication transmission system according to claim 1, wherein said array comprises means for positioning said solid state semi-conductor devices linearly and radially.

16. An infrared communication transmission system according to claim 1, wherein said transmitter is mounted on a naval vessel.

17. An infrared communication transmission system according to claim 1, further comprising means for uniformly spacing said plurality of semiconductor devices within said array.

18. An infrared comprising means transmission system according to claim 1, further comprising means for closely spacing said plurality of semiconductor devices of said array.

19. An infrared communication transmission system comprising:
    an assembly comprising a plurality of solid state semiconductor devices arranged in an array, said array defining a shape and comprising means for generating an infrared radiation pattern; and
    means for transmitting said infrared radiation pattern to a remote infrared receiver, said means for transmitting comprising means for selectively transmitting infrared radiation as a beacon pattern, a signal pattern, a digital data pattern or an analog data pattern.

20. An infrared communication transmission system according to claim 1, wherein said means for transmitting comprises means for transmitting either of a continuous radiation pattern or a pulsed radiation pattern.

21. An infrared communication transmission system comprising:
    an assembly comprising a plurality of solid state semiconductor devices arranged in an array, said array defining a shape and comprising means for generating an infrared radiation pattern, said assembly comprising a closely and uniformly spaced array of said solid state semiconductor devices; and
    means for transmitting said infrared radiation pattern towards a remote infrared receiver.

22. An infrared communication transmission system according to claim 21, further including means for generating an information bearing signal; and
    means for modulating said infrared radiation pattern by said information bearing signal to produce a modulated infrared radiation pattern.

* * * * *

UNITED STATES PATENT AND TRADEMARK OFFICE
CERTIFICATE OF CORRECTION

PATENT NO. : 5,159,480
DATED : October 27, 1992
INVENTOR(S) : David Gordon et al.

It is certified that error appears in the above-indentified patent and that said Letters Patent is hereby corrected as shown below:

On the cover page, at section [75], delete Inventor; "Larry W. Dunford" and "Nevin P. Carr".
On the cover page, at section [57], line 1 under Abstract, insert ---system--- after "transmission".
At column 2, line 61, insert ---according to the present invention includes a radiation--- after "transmitter".
At column 2, line 63, delete "," after "radiation".

Signed and Sealed this

Twenty-eight Day of February, 1995

Attest:

BRUCE LEHMAN

Attesting Officer

Commissioner of Patents and Trademarks